United States Patent [19]

Kogane

[11] 4,417,808

[45] Nov. 29, 1983

[54] PHOTOGRAPHIC PAPER CUTTER

[75] Inventor: Mikio Kogane, Kanagawa, Japan

[73] Assignee: Fuji Photo Film Co., Ltd., Kanagawa, Japan

[21] Appl. No.: 363,734

[22] Filed: Mar. 30, 1982

[30] Foreign Application Priority Data

Apr. 1, 1981 [JP] Japan .................................. 56-49196

[51] Int. Cl.³ .............................................. G03B 29/00

[52] U.S. Cl. ......................................... 355/29; 83/262

[58] Field of Search .................... 355/29; 83/262, 365, 83/367, 370, 371

[56] References Cited

U.S. PATENT DOCUMENTS 3,718,807 2/1973 Bracken et al. ........................ 355/29

FOREIGN PATENT DOCUMENTS 1339937 12/1973 United Kingdom .................. 83/262

*Primary Examiner*—Monroe H. Hayes

*Attorney, Agent, or Firm*—Sughrue, Mion, Zinn, Macpeak, and Seas

[57] ABSTRACT

A photographic paper cutter includes a cutting station where a guide clip is severed from the paper to drop out of the travel path, and an image frame cutter for dividing the paper into individual photographs. Prior to being severed, the guide clip assists in aligning the strip so as to be perpendicular to the conveyance direction in cooperation with a pair of guide clip sensors.

10 Claims, 3 Drawing Figures

PHOTOGRAPHIC PAPER CUTTER

BACKGROUND OF THE INVENTION

This invention relates to a photographic paper cutter which cuts into individual image frames a strip of developed photographic paper fed by a photographic paper guide clip engaging the leading edge thereof.

In order to develop images printed on a strip of photographic paper, it is known to employ a rod-shaped photographic paper guide clip to engage the leading edge of the photographic paper, and a conveying means, such as a chain conveyor, engaging both ends of the photographic paper guide clip, and moving round in a developing tank. When cutting the strip of developed photographic paper into individual image frames, it is necessary to remove the photographic paper guide clip, and ensure that only the strip of photographic paper be fed to the cutter for cutting it into the individual frames.

SUMMARY OF THE INVENTION

In view of such requirement, it is an object of this invention to provide a photographic paper cutter which is suitable for guiding to a cutting station a strip of photographic paper guided by a photographic paper guide clip and emerging continuously from a developing apparatus, removing the photographic paper guide clip, and guiding only the strip of photographic paper to an image frame cutter without causing it to meander. The photographic paper cutter of this invention comprises guide means for feeding to a cutting station a photographic paper guide clip engaging the leading edge of a strip of developed photographic paper, a photographic paper guide clip cutter for separating the photographic paper guide clip by cutting the strip of photographic paper engaged by the photographic paper guide clip fed by the guide means, separating and guiding means for causing the separated photographic paper guide clip to drop from the path of travel, and guiding the leading edge of the cut strip of photographic paper, and an image frame cutter for cutting the strip of photographic paper guided by the separating and guiding means into individual image frames.

BRIEF DESCRIPTION OF THE DRAWINGS

The photographic paper cutter of this invention will now be described by way of example with reference to the accompanying drawings, in which.

DETAILED DESCRIPTION OF THE PREFERRED EMBODIMENTS

Figure 1:
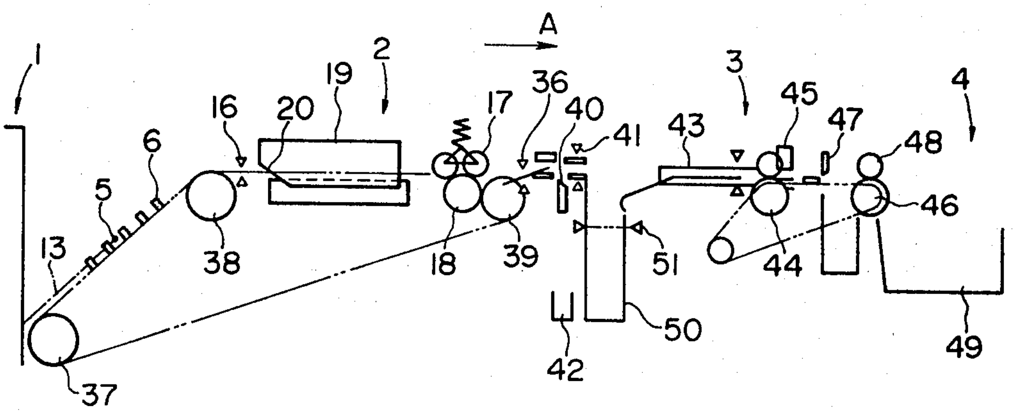
FIG. 1 is a diagrammatic side elevational view of a photographic paper cutter embodying this invention.

A strip of photographic paper 13, which has been developed and dried in a developing and drying station 1, has its leading edge engaged by a photographic paper guide clip 5, and is conveyed by a pair of parallel chains 6 in a conveying station 2. The chains 6 are provided on both sides of the photographic paper, and engage ends of the photographic paper guide clip 5 for conveying the strip 13. When the strip 13 is being conveyed in the conveying station 2, the direction of its travel is adjusted to suit, and the strip 13 is cut away from the photographic paper guide clip 5 in the vicinity of an inlet to a cutting station 3, so that only the strip of photographic paper 13 may be fed into the cutting station 3 where it is cut into individual image frames for delivery into a sorter 4.

Figure 2:
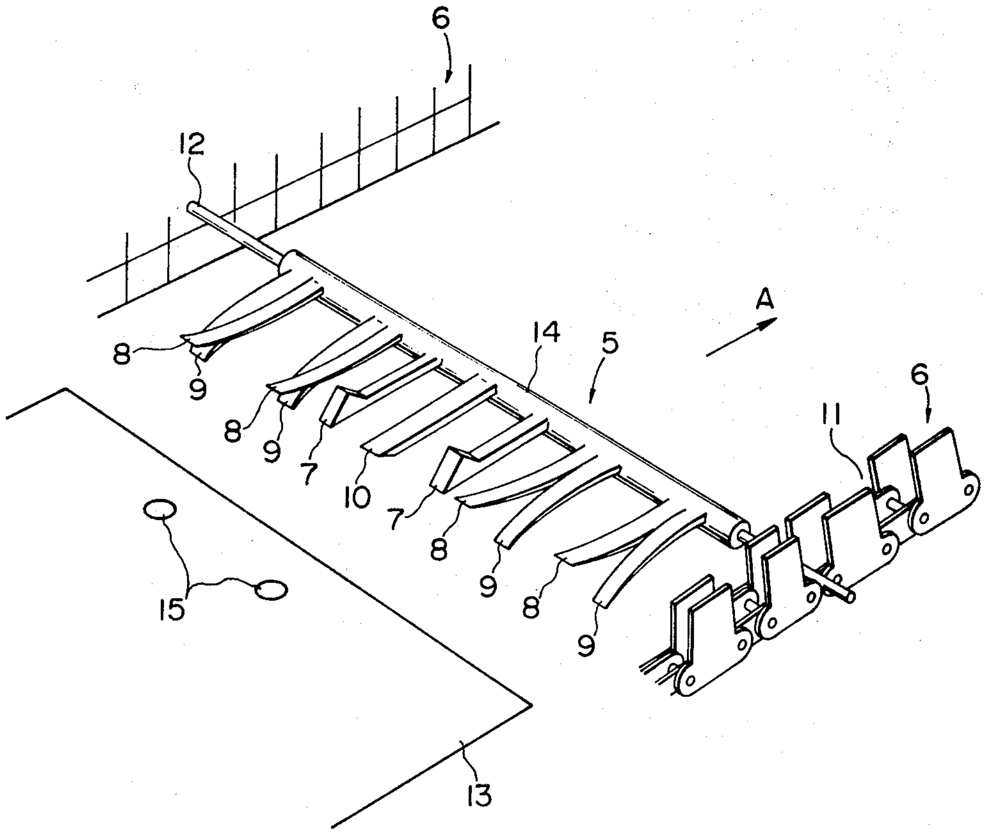
FIG. 2 is a perspective view of the photographic paper guide clip and the chains according to this invention.

FIG. 2 is a perspective view of the photographic paper guide clip 5 and the chains 6 according to this invention.

The photographic paper guide clip 5 comprises a rigid rod portion 12, and an engaging portion 14 formed from an elastic material, such as a resin, integrally with the rod portion 12. Each end of the rod portion 12 is received in a groove 11 of one of the chains 6. The grooves 11 of both the chains 6 are aligned with each other relative to the direction of conveyance indicated by the arrow A; therefore, the photographic paper guide clip 5 is positioned at right angles to the direction of conveyance. The grooves 11 of the chains 6 are detected by a photoelectric sensor not shown, and the clip 5 is engaged with the chains by a solenoid, or the like. The engaging portion 14 is provided with engaging pawls 7, upwardly curved projections 8, downwardly curved projections 9 and a central engaging projection 10 all of which extend in a direction opposite to the direction of conveyance A. The strip of photographic paper 13 has its leading edge inserted between the upwardly and downwardly curved projections 8 and 9, and the engaging pawls 7 engage with the perforations 15 formed in the leading edge of the photographic paper, whereby the strip of photographic paper 13 is engaged by the photographic paper guide clip 5. In order to set the photographic paper guide clip 5 correctly on the pair of chains 6, it is also possible to provide a clutch for each chain 6, and detect any positional deviation of each end of the photographic paper guide clip 5 relative to the direction of conveyance after the clip has been engaged with the chain grooves 11. If both ends of the rod portion 12 have been engaged in a pair of chain grooves 11 in a mutually misaligned relationship, resulting in a failure of the photographic paper guide clip 5 to extend at right angles to the direction of conveyance A, the drive for one of the chains may be released so that the photographic paper guide clip 5 may be positioned at right angles to the direction of conveyance A. The former method is, however, preferable to the latter, since it involves a temporary interruption in the conveyance.

Referring to FIG. 1, when the photographic paper guide clip 5 passes through a first sensor 16, the pacer rollers 17 provided at the exit of the conveying station 2 cease to be pressed against a feed roller 18, and the rollers 17 and 18 form therebetween a space sufficient for the passage of the photographic paper guide clip 5, thereby providing a standby condition.

When the photographic paper guide clip 5 has reached the rear tapered portions 20 of guide plates 19, it thrusts the guide plates upward, and after the clip 5 has moved past them, the guide plates 19 fall by their own weight to guide the strip of photographic paper 13.

Figure 3:
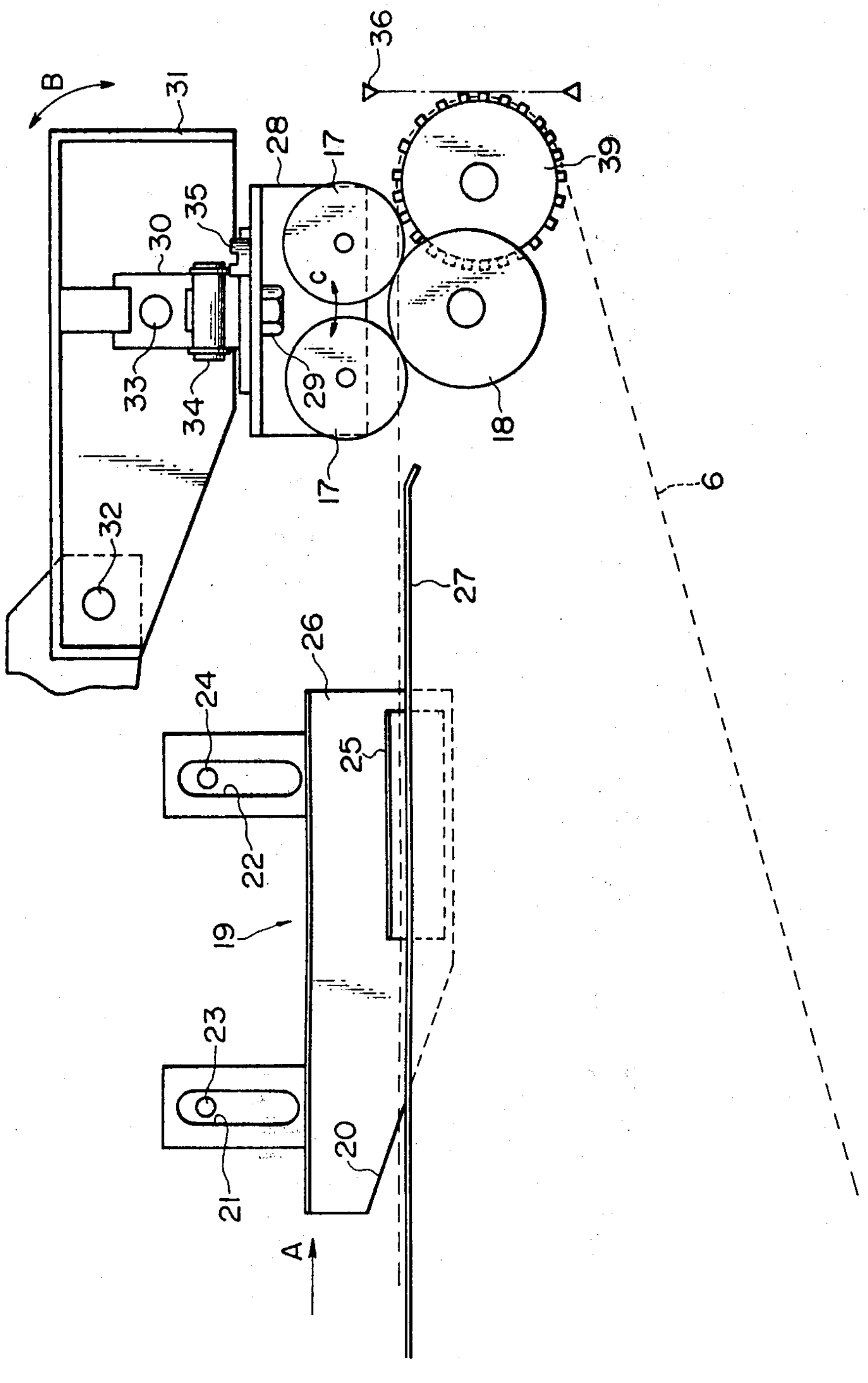
FIG. 3 is a schematic side elevational view showing the guide plate, the pacer rollers and the feed roller in the conveying station according to this invention.

FIG. 3 is a schematic side elevational view showing the guide plates 19, the pacer rollers 17 and the feed roller 18 in the conveying station 2. The guide plate 19 has a pair of vertical slots 21 and 22 in which fixed shafts 23 and 24 are respectively loosely received. A holding plate 25 maintains surface contact with a conveying table 27 before the strip of photographic paper 13 is conveyed. If the photographic paper guide clip 5 abuts the tapered portions 20 and moves forward, the guide plate 19 is thrusted upward with sliding displacement of the slots 21 and 22 relative to the fixed shafts 23 and 24. Immediately after the clip 5 has passed through the guide plate 19, the guide plate 19 falls under its own weight, and the holding plate 25 drops onto the strip 13. Then, the strip of photographic paper 13 is guided by the holding plate 25 and side plates 26. It sometimes occurs that the strip 13 has been twisted when it has been developed and dried. Any twist on the strip of photographic paper produces fatally undesirable results during the cutting process if it is conveyed under pressure between the pacer rollers 17 and the feed roller 18. It is impossible to cut twisted or wrinkled photographic paper at right angles. The cutter marks provided on the photographic paper are displaced if it is twisted or wrinkled, and thus cannot be detected properly; and therefore, it is impossible to correctly operate the cutter. Therefore, the guide plate 19 according to this invention serves to rectify promptly any twist that may form in the strip of photographic paper. It also serves to prevent any meandering of photographic paper that may occur if the photographic paper guide clip has erroneously been positioned across a pair of misaligned chain grooves.

The pacer rollers 17 are rotatably supported by a side plate 28 connected to a post 30 by a bolt 29. The post 30 is connected to a swing plate 31 supported rotatably on a fixed pin 32 so that it may swing in the direction of an arrow B. The side plate 28 is movable about a pin 33 in the direction of an arrow C, while it is also movable about a pin 34 to vary the inclination of the axes of the paper rollers 17. An eccentric pin 35 permits rotational adjustment of the axes of the rollers 17 in a horizontal direction. These arrangements ensure that the pacer rollers 17 snugly fit the feed roller 18. Even if, as a result of an error in manufacture, or the like, the axis of the feed roller 18 fails to be located in its optimum position, the movability of the pacer rollers 17 in the aforesaid three directions ensures that the pacer rollers 17 maintain uniform surface contact with the feed roller 18 along their entire length. It is, therefore, possible to prevent any meandering of the strip of photographic paper 13. When the first sensor 16 has detected the passage of the photographic paper guide clip 5, the pacer rollers 17 are elevated. This elevation is achieved by the swing plate 31, which is caused by a motor (not shown), or the like to swing about the fixed pin 32.

A second sensor 36 is provided at the exit of the conveying station 2. The second sensor 36 may, for example, comprise a photoelectric sensor, and is mounted in the position where the chains 6 are closest to the cutting station 3, for detecting the position in which the photographic paper guide clip 5 leaves the chain grooves 11. A pair of second sensors 36 are connected to each other via an AND circuit. If the photographic paper guide clip 5 is mounted across a pair of misaligned chain grooves, one end of the clip 5 will reach one of the second sensors before the other end of the clip 5 reaches the other second sensor, so that the apparatus will continue to be driven. As soon as the other end of the clip 5 reaches the other second sensor, the other second sensor detects the other end of the clip, and the AND circuit is actuated to lower the pacer rollers 17 so that the strip of photographic paper may be held between the pacer rollers 17 and the feed roller 18. The AND detection of the second sensors 36 maintains the photographic paper guide clip 5 at right angles to the direction of conveyance. The second sensors 36 also advantageously serve to satisfactorily compensate for any misalignment of the chain grooves that may arise from the loosening of the chains 6, or from any other cause.

The chains 6 are driven by sprockets 37 to 39 for conveying the photographic paper guide clip 5 connected to the strip of photographic paper 13. After the pacer rollers 17 have been lowered, the feed roller 18 conveys the strip 13, and the strip 13 moves the guide clip forward. The pacer rollers 17 are preferably urged against the feed roller 18 by a pressure of, say, 3 kg.

A clip cutter 40 is provided in the vicinity of the entrance to the cutting station 3. As hereinabove described, the strip of photographic paper is now conveyed by the feed roller 18 and the pacer rollers 17, and the rigidity of the photographic paper per se conveys the photographic paper guide clip 5 to a third sensor 41. The third sensor 41 detects the leading edge of the clip 5, and the clip cutter 40 is actuated. The cutter is spaced from the third sensor 41 by an optimum distance for cutting the strip 13 adjacent to the clip 5, whereby the photographic paper guide clip 5 is separated from the photographic paper 13. In the event that only the clip 5 has erroneously been conveyed, the third sensor 41 will not transmit a signal for actuating the clip cutter 40. The feed roller 18 does not convey the photographic paper as long as the clip cutter 40 is in operation.

The photographic paper guide clip 5, which has been separated from the photographic paper 13 in the vicinity of its leading edge, falls into a chute 42. The photographic paper 13 is guided through a guide plate 43 by the feed roller 18, and passes between a cutter feed roller 44 and a mark sensor 45. The mark sensor 45 detects the cut marks on the photographic paper 13, and transmits a signal for actuating a paper cutter which will hereinafter be described in further detail. The cutter feed roller 44 is driven at a low speed as soon as the leading edge of the photographic paper has been detected by the third sensor 41. The cutter feed roller 44 begins to be driven at a normal speed as soon as the leading edge of the photographic paper is detected by the mark sensor 45.

The cutting station 3 further includes a feed roller 46, the paper cutter 47 and a press roller 48. The feed roller 46 is positioned opposite to the press roller 48. The paper cutter 47 is provided between the feed rollers 44 and 46 which support the trailing and leading edges, respectively, of the photographic paper during the cutting operation. Upon completion of the cutting operation, the feed roller 46 guides each severed paper portion into a chute 49 of the sorter 4. The photographic paper is conveyed over a certain distance after its cut mark has been detected by the mark sensor 45, and then, the paper is stopped and cut. While the feed rollers 44 and 46 convey the strip of photographic paper 13 intermittently with the intermittent operation of the paper cutter, the feed roller 18 feeds it continuously, resulting in the formation of a loop of photographic paper between the conveying station 2 and the cutting station 3. According to this invention, therefore, a loop forming position for the intermittent feeding of photographic paper to the image frame cutter 47 is provided between a position for dropping the photographic paper guide clip 5 separated from the strip of photograhic paper, and the guide plate 43 into which the leading edge of the photographic paper is guided. A protection frame 50 is provided in the loop forming position for protecting the loop. A horizontally disposed photoelectric sensor 51 is provided in the protection frame for detecting the lower extremity of the loop of intermittently fed photographic paper 13, which gradually rises. Even if the feed roller 18 is out of operation, therefore, it is possible to protect the photographic paper from being broken in the protection frame while being fed forward intermittently downstream of the feed roller 18. In other words, as soon as the photoelectric sensor 51 has detected the lower extremity of the loop, it is possible to start the conveyance of photographic paper again through the conveying station 2, or release the pacer rollers 17 from the strip of photographic paper.

As is obvious from the foregoing description, the photographic paper cutter of this invention permits intermittent conveyance of the strip of photographic paper 13 in the cutting station 3, though it is continuously conveyed in the conveying station 2. The guide plate 19 in the conveying station 2 prevents or rectifies twisting or meandering of the strip of photographic paper. The signal transmitted by the second sensors 36 maintains the photographic paper guide clip 5 at right angles to the direction of photographic paper conveyance. This, as well as the conveyance of photographic paper by the pacer rollers 17 and the feed roller 18, ensures that the photographic paper is cut at right angles to the direction of its conveyance when the photographic paper guide clip is removed therefrom.

What is claimed is:

1. A photographic paper cutter, comprising; a cutting station, a photographic paper guide clip for transporting a strip of photographic paper, guide means for feeding to said cutting station said photographic paper guide clip while engaging a leading edge of said strip of photographic paper, a photographic paper guide clip cutter for separating said photographic paper guide clip by cutting said strip of photographic paper engaged by said photographic paper guide clip fed by said guide means, separating and guiding means for causing said separated photographic paper guide clip to drop from a travel path of said paper, and for guiding the leading edge of said cut strip of photographic paper, and an image frame cutter for cutting said strip of photographic paper guided by said separating and guiding means into individual image frames.

2. A photographic paper cutter as set forth in claim 1, wherein said guide means comprises transfer means engaging both ends of said photographic paper guide clip, and guide plate means actuated by said photographic paper guide clip fed by said transfer means for restraining the longitudinal edges of said strip of photographic paper following said photographic paper guide clip.

3. A photographic paper cutter as set forth in claim 1, wherein said separating and guiding means includes means receiving said separated photographic paper guide clip, means for guiding said leading edge of said strip of photographic paper, and a loop forming region provided between said receiving means and said guiding means, paper from said loop being intermittently fed to said image frame cutter.

4. A photographic paper cutter as set forth in claim 3, said guide means delivering photographic paper to said image frame cutter, said cutter intermittently advancing said paper strip as individual image frames are cut therefrom, said strip being momentarily halted for cutting, whereby said loop forming region comprises a buffer zone between said intermittent image frame cutter and continuously operating means feeding said paper strip to said image cutter.

5. A photographic paper cutter as set forth in claim 2, wherein said guide plate means comprises upper and lower plates, said upper plate being raised by contact with said paper guide clip, and falling after passage of said guide clip to engage and guide said strip.

6. A photographic paper cutter as set forth in claim 5, said guide means further comprising sensor means for detecting ends of said guide clip, and for lowering a pair of pacer rollers onto said strip when both said ends are detected, to thereby square said strip with respect to the conveyance direction thereof.

7. A photographic paper cutter as set forth in claim 6, said pacer roller being arranged confronting a drive roller, and being in contact with said drive roller through said strip after said ends are detected, said drive roller driving said strip toward said guide clip cutter and said image frame cutter.

8. A photographic paper cutter as set forth in claim 4, said feeding means comprising drive roller means for conveying said paper strip successively to said guide clip cutter and said image frame cutter.

9. A photographic paper cutter as set forth in claim 4 or 8, wherein said loop forming region includes loop protecting means housing said loop, said protecting means including sensor means for detecting the presence of said loop.

10. A photographic paper cutter as set forth in claim 1, said image frame cutter receiving said strip of paper from a guide plate of said separating and guiding means, and including mark sensing means and a cutter feed roller, said cutter feed roller being brought up to a normal operating speed from a lower speed upon detection of said strip by said mark sensing means.

* * * * *